United States Patent [19]

Wernli

[11] 3,783,387

[45] Jan. 1, 1974

[54] NOISE DETECTOR CIRCUIT

[75] Inventor: Andreas Wernli, Charlottesville, Va.

[73] Assignee: General Electric Company, Lynchburg, Va.

[22] Filed: June 14, 1972

[21] Appl. No.: 262,537

[52] U.S. Cl. .................... 325/348, 178/88, 325/320, 325/478, 340/207

[51] Int. Cl. .............................................. H04b 1/10

[58] Field of Search ...................... 178/49, 66 R, 88; 325/42, 313, 320, 323, 348, 362, 394, 402, 473, 477, 478, 480; 328/165, 168; 340/207

[56] References Cited

UNITED STATES PATENTS 3,497,812 2/1970 Dixon ................................ 325/320

*Primary Examiner*—Malcolm A. Morrison
*Assistant Examiner*—R. Stephen Dildine, Jr.
*Attorney*—James J. Williams et al.

[57] ABSTRACT

In a power-line carrier receiver having a discriminator that produces output signals in response to frequency-shift-keyed signals, a noise detector circuit is provided to squelch the receiver under certain noise conditions. The detector circuit uses two trigger circuits having a signal-to-noise ratio detector threshhold and a noise spike threshhold. If a low signal-to-noise ratio is detected, or if a noise spike is detected, the respective trigger circuit produces a signal to squelch or disable the receiver.

4 Claims, 2 Drawing Figures

NOISE DETECTOR CIRCUIT

BACKGROUND OF THE INVENTION

My invention relates to an improve noise detector circuit, and particularly to such a detector circuit that has two separate noise detectors, either of which can squelch a receiver in response to a selected condition.

In power line carrier systems, one or more communication channels are provided over the 60 Hertz power lines between selected points. These channels are used in various ways, including voice communication, teletype, telemetering, and relaying. Typically, telemetering and relaying use a frequency-shift keying transmitter which transmits one of two frequencies to a receiver. The presence of a first frequency indicates a first condition, and the presence of a second frequency indicates a second condition. In relaying, the transmission of the first frequency indicates that no function should take place at a receiver; and the transmission of the second frequency indicates that an important function, such as opening a high-voltage power transmission line, should take place. Since the power line carrying the frequency-shift-keyed signals is exposed to many noise sources, it is very desirable, if not essential, that the receiver be squelched under certain undesirable noise conditions. That is, no receiver output is preferred over an erroneous receiver output. In frequency-shift-keying, no output would not cause a function to occur, whereas an erroneous output (that is, apparent reception of the second of the two transmitted frequencies) could cause an erroneous function to occur.

Accordingly, an object of my invention is to provide a new and improved noise detector circuit that provides an indication in response to either of two noise conditions.

Another object of my invention is to provide a new aned improved noise detector circuit for use with a frequency-shift-keyed receiver in a power line carrier system.

A relatively specific object of my invention is to provide a new and improved detector circuit that is connected to a frequency-shift-keyed receiver, and that produces a squelch signal in response to a tone signal having either a signal-to-noise ratio below a selected value or noise spikes above a selected amplitude.

SUMMARY OF THE INVENTION

Briefly, these and other objects are achieved in accordance with my invention by deriving a signal from the discriminator output of a frequency-shift-keyed receiver. This signal may be amplified, and applied to a high pass filter which blocks frequencies below a selected value, for example 300 Hertz. The signal frequencies above the selected value are rectified, and the rectified signals are applied to two trigger circuits. One trigger circuit responds to rectified signal indicative of a signal-to-noise ratio below a selected value, and the other trigger circuit responds to rectified signals indicative of noise spikes or pulses above a selected amplitude. Response of either or both trigger circuits is used to squelch a receiver, and thus prevent an erroneous output from the receiver with a consequent possible erroneous operation in a power line carrier frequency-shift-keyed relaying system.

BRIEF DESCRIPTION OF THE DRAWING

The subject matter which I regard as my invention is particularly pointed out and distinctly claimed in the claims. The structure and operation of my invention, together with further objects and advantages, may be better understood from the following description given in connection with the acompanying drawing, in which:

DESCRIPTION OF THE PREFERRED EMBODIMENT

Figure 1:
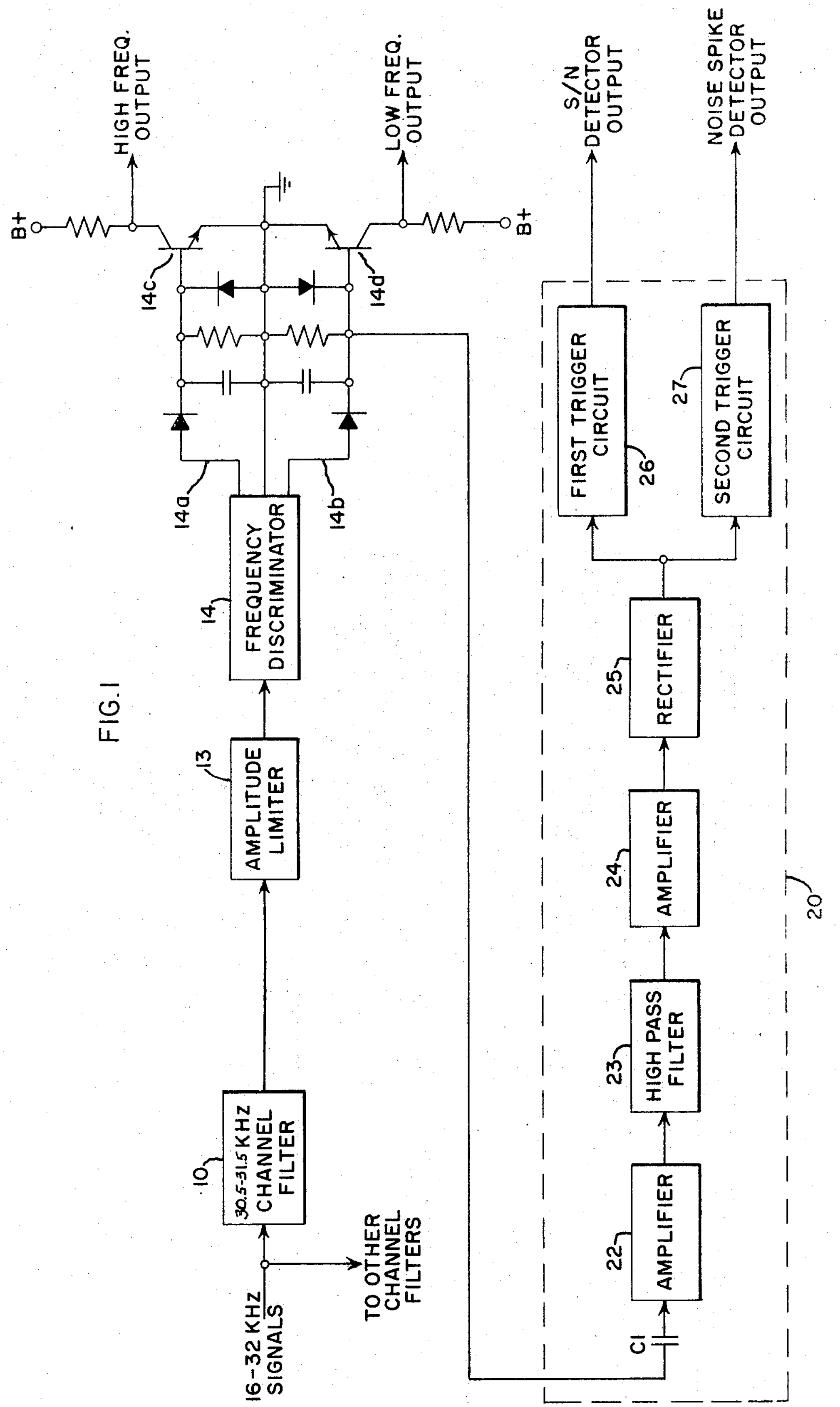
FIG. 1 shows a block diagram of a frequency-shift-keyed receiver for use in a power-line carrier system, the receiver having a noise detector circuit in accordance with my invention.

In order that the function and operation of my novel detector circuit can be better understood, I have shown, in FIG. 1, one example of a known power line carrier receiver with which my detector circuit can be used. In a typical power line carrier system, four, single-sideband channels having a bandwidth of 4 kilohertz each are provided. As mentioned earlier, the channels may be used in any way desired, such as voice communication, teletype, telemetering, or relaying. The four channel frequencies are converted as a 16 kilohertz band to respective higher frequencies somewhere in the power line carrier band (generally 8 to 300 kilohertz) and transmitted over the power line to a receiver. At the receiver, the channel frequencies are converted as a group to group frequencies between 16 and 32 kilohertz. After this conversion, the signals are applied to four channel filters. In FIG. 1, only one channel filter 10 is shown. This filter 10 is assumed to be for the telemetering or relaying channel which carries either of two tones, at 30.5 or 31.5 kilohertz for example, depending upon the function to be provided. The other three channel filters (not shown) might pass the bands of 16–20 kilohertz, 20–24 kilohertz, and 24–28 kilohertz respectively if the other three channels carried voice signals. Signals passed by the filter 10 are applied to an amplitude limiter 13. Since the signals in the particular channel being shown are assumed to be frequency-shift-keyed signals (that is, their intelligence is conveyed by their frequency), the limiter 13 limits the signal amplitude to eliminate as much noise as possible. The amplitude-limited signals are applied to a frequency discriminator 14, part of which is shown in block diagram form, and part of which is shown schematically. As known, the frequency discriminator 14 detects changes in frequency of applied signals, and produces output signals having an amplitude representative of those frequences. With respect to the discriminator 14 of FIG. 1, the signals associated with the higher frequency (assumed to be 31.5 kilohertz) are produced at a line 14*a*, and the signals associated with the lower frequency (assumed to be 30.5 kilohertz) are producted at a line 14*b*. These signals are rectified and filtered, and applied to respective transistors 14*c*, 14*d*. The transistors 14*c*, 14*d* are supplied with suitable direct current voltage B+, and produce respective signals indicative of a high frequency output and a low frequency output as indicated.

The circuit described thus far is known in the art. As mentioned earlier, it is extremely important that the relaying receiver not respond and produce such outputs under high noise conditions, since such outputs might cause an erroneous function, such as the line failure condition just mentioned. Under high noise conditions, which may be present in power transmission lines, it is desirable that the receiver be squelched or made inoperative in order to avoid a false or erroneous indication. This is done in accordance with my invention by a new and improved noise detector circuit 20 shown in the lower portion of FIG. 1 enclosed in dashed lines. In accordance with my invention, I derive a direct current signal from the discriminator 14, preferably the direct current signal indicating a low frequency output signal. The direct current level of this signal indicates the instantaneous frequency present. If only tone (with no noise) is received, the direct current level is relatively steady. However, if noise is present, it is super-imposed on the tone, causing the direct current level to change with the noise variations. Changes in the direct current level are coupled through a capacitor C1 to an amplifier 22. The amplifier signals are then passed through a high-pass filter 23 which passes signals above a selected frequency, preferably in the order of 300 Hertz and above. I have included the filter 23 in order to reject lower frequency signals, particularly 60 Hertz signals, which may be present in large amplitudes. The filtered signals are then amplified by another amplifier 24, and then supplied to a full wave rectifier 25. The direct current signals from the rectifier 25 are applied to first and second trigger circuits 26, 27. These trigger circuits 26, 27 are provided in order to sense two conditions, namely a selected signal-to-noise ratio and high-amplitude noise spikes. If the trigger circuit 26 detects a signal-to-noise ratio below a selected level, this trigger circuit 26 produces an output signal which squelches the receiver. If the trigger circuit 27 detects a noise spike amplitude above a selected amplitude, this trigger circuit 27 produces an output signal which squelches the receiver. The exact circuit for providing squelch is not shown, since it may take a number of known forms or embodiments. It is sufficient to say that the receiver is not squelched if a signal-to-noise ratio above a selected level is present and if noise spikes below a selected amplitude are present; but that the receiver is squelched if either a signal-to-noise ratio below the selected level is present, or a noise-spike amplitude in excess of the selected amplitude is present.

Figure 2:
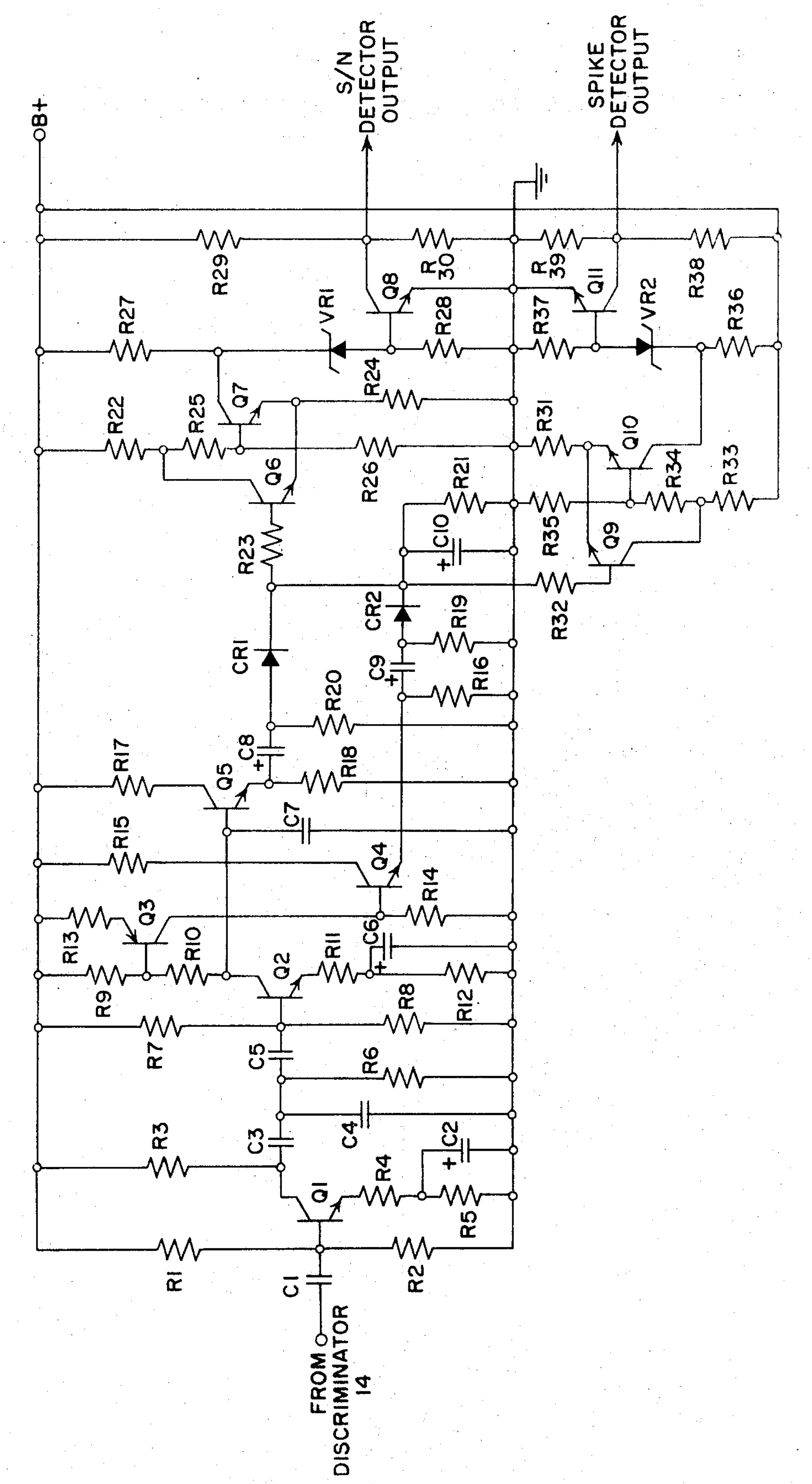
FIG. 2 shows a schematic diagram of my noise detector circuit of FIG. 1.

FIG. 2 shows a complete schematic diagram of a preferred embodiment of my noise detector circuit 20 of FIG. 1. My detector circuit is provided with a suitable source of direct current voltage indicated as B+, which is supplied between the voltage terminal and a common terminal or ground. Signals from the discriminator 14 of FIG. 1 are coupled through the capacitor C1 to my detector, and applied to the amplifier 22 which comprises a transistor Q1. Signals from the transistor Q1 are supplied to the high-pass filter 23 comprising three capacitors C3, C4, C5, and a resistor R6. The filtered signals are applied to the amplifier 24 which comprises a transistor Q2. Signals from the transistor Q2 are applied directly to an emitter-follower transistor Q5; and are phase-inverted by an inverter-transistor Q3 and applied to an emitter-follower transistor Q4. Phase-inverted outputs from the emitter-follower transistors Q5, Q4 are applied to respective rectifiers CR1, CR2 to provide full-wave rectified signals. The cathodes of the rectifiers CR1, CR2 represent the common output of the rectifier 25 in FIG. 1. These rectified signals are integrated or filtered by a capacitor C10 and a resistor R21, and applied to the first and second trigger circuits 26, 27. The first trigger circuit 26 serves as the signal-to-noise ratio detector circuit, and comprises two transistors Q6, Q7 connected in the form of a Schmitt trigger. Output signals from this circuit are derived at the collector of the transistor Q7 and applied through a zener diode VR1 to an output transistor Q8. Similarly, the second trigger circuit 27 serves as the noise spike detector circuit, and comprises two transistors Q9, Q10 also connected in the form of a Schmitt trigger circuit. Output signals from this circuit are derived at the collector of the transistor Q10 and applied through a zener diode VR2 to an output transistor Q11.

In the operation of my detector circuit, variations in the direct current level from the discriminator 14 are capacitively coupled to my detector 20 and amplified, filtered, and rectified, and applied to the trigger circuits 26, 27. The trigger circuits 26, 27 are set or adjusted so that under low noise conditions, the transistors Q6, Q9 are turned off, and the transistors Q7, Q10 are turned on. The magnitude of the rectifier output voltage needed to turn the transistors Q6, Q9 on is determined by the bias or reference voltages set by the resistors R22, R25, R26, R24 and the resistors R33, R34, R35, R31. If this rectifier output voltage rises slowly, as it will in response to gradually increasing noise (i.e., a gradual reduction in the signal-to-noise ratio), the integrator capacitor C10 charges up and eventually causes the transistor Q6 to turn on. This causes the trigger circuit 26 to switch so that the transistor Q7 is turned off. When the transistor Q7 is turned off, the voltage at the collector of the transistor Q7 rises, and suddenly breaks down the zener diode VR1. This causes the transistor Q8 to turn on so that the voltage at the output terminal falls from a positive value (which can be considered a logic 1) to substantially zero (which can be considered a logic 0) in a very rapid or trigger-like fashion. When the rectifier output voltage falls again, the trigger circuit 26 returns to the original condition, and the output voltage becomes positive again. Thus, a poor signal-to-noise ratio, determined by the bias or reference voltage provided by the resistors associated with the transistors Q6, Q7, is indicated. In a similar fashion, if a short duration, high amplitude, rectifier output voltage is produced (in response to a noise spike), this causes the transistor Q9 to turn on. This switches the trigger circuit 27 so that the transistor Q10 is turned off. When the transistor Q10 is turned off, the voltage at the collector of the transistor Q10 rises, and suddenly breaks down the zener diode VR2. This causes the transistor Q11 to turn on so that the voltage at the output terminal falls from a positive value to substantially zero in a very rapid or trigger-like fashion. As soon as the noise spike falls, the trigger circuit 27 returns to its original condition, and thhe output voltage becomes positive again. In both circuits 26, 27, switching is rapid because of the full wave rectifier action and the regenerative switching action of the Schmitt trigger circuits.

The output signals from the transistors Q8, Q11 can be utilized in various known ways to squelch or unsquelch the associated receiver, such as at a point ahead of the channel filters. If both output signals are at a positive voltage (or a logic 1), the receiver can be unsquelched and receptive to frequency-shift-keyed signals. However, if either output signal goes to a low or zero voltage (a logic 0), indicating a respectively poor signal-to-noise ratio or a high noise spike, this low voltage can be used to squelch the receiver and block it from providing what might be a possible erroneous indication. The exact level below which the signal-to-noise ratio produces a poor signal output or the exact high amplitude of a noise spike can be determined by the values of the bias resistors. While it may seem undesirable to have the receiver squelched under noisy conditions, particularly if the transmitted signal is indicating normal power line conditions, such noisy conditions are not continuously long. Typically, such noises do not last for more than a second or two at a time. Once the noise stops, the receiver becomes unsquelched and can then operate on the basis of the particular signal then being received. In this way, a possible erroneous operation in response to noise can be eliminated. The circuit of FIG. 2 has been constructed and used with actual power line carrier receivers with satisfactory results. In this circuit, the components shown in FIG. 2 had the following values:

| Component | Value |
|---|---|
| B+ voltage | +36 volts |
| Resistor R1 | 82,000 ohms |
| Resistor R2 | 43,000 ohms |
| Resistor R3 | 1,960 ohms |
| Resistor R4 | 215 ohms |
| Resistor R5 | 1,800 ohms |
| Resistor R6 | 909 ohms |
| Resistor R7 | 56,200 ohms |
| Resistor R8 | 13,300 ohms |
| Resistor R9 | 2,370 ohms |
| Resistor R10 | 6,190 ohms |
| Resistor R11 | 750 ohms |
| Resistor R12 | 2,610 ohms |
| Resistor R13 | 1,780 ohms |
| Resistor R14 | 7,500 ohms |
| Resistor R15 | 511 ohms |
| Resistor R16 | 1,470 ohms |
| Resistor R17 | 511 ohms |
| Resistor R18 | 1,960 ohms |
| Resistor R19 | 2,200 ohms |
| Resistor R20 | 2,200 ohms |
| Resistor R21 | 10,000 ohms |
| Resistor R22 | 61,900 ohms |
| Resistor R23 | 10,000 ohms |
| Resistor R24 | 1,000 ohms |
| Resistor R25 | 17,800 ohms |
| Resistor R26 | 4,640 ohms |
| Resistor R27 | 21,500 ohms |
| Resistor R28 | 10,000 ohms |
| Resistor R29 | 38,300 ohms |
| Resistor R30 | 6,190 ohms |
| Resistor R31 | 1,470 ohms |
| Resistor R32 | 10,000 ohms |
| Resistor R33 | 61,900 ohms |
| Resistor R34 | 10,000 ohms |
| Resistor R35 | 13,300 ohms |
| Resistor R36 | 6,190 ohms |
| Resistor R37 | 10,000 ohms |
| Resistor R38 | 38,300 ohms |
| Resistor R39 | 6,190 ohms |
| Capacitors C1 | 0.022 microfarad |
| Capacitor C2 | 1 microfarad |
| Capacitor C3 | 0.47 microfarad |
| Capacitor C4 | 0.022 microfarad |
| Capacitor C5 | 0.015 microfarad |
| Capacitor C6 | 1 microfarad |
| Capacitor C7 | 4700 micromicrofarads |
| Capacitor C8 | 1 microfarad |
| Capacitor C9 | 1 microfarad |
| Capacitor C10 | 1 microfarad |
| Transistors Q1, Q2, Q6, Q8, Q9, Q11 | Type 2N3227 |
| Transistor Q3 | Type 2N2800 |
| Transistors Q4, Q5, Q7, Q10 | Type 2N3053 |
| Diodes CR1, CR2 | Type 1 N645 |
| Zener Diodes VR1, VR2 | Type 1N5250, 20 volts |

With the circuit having the above values, the first trigger circuit bias voltage was approximately 1.5 volts and the second trigger circuit bias voltage was approximately 4.8 volts. With these values, output voltages of +5 volts each (a logic 1) were produced for a good signal-to-noise ratio in excess of about 10 db for example, and a spike noise below about 0 db for example. Whenever the signal-to-noise ratio fell below this 10 db range, or whenever the noise spike detector exceeded this 0 db range, the respective output fell to substantially zero volt (a logic 0), and this was used to squelch the receiver. It will thus be seen that my invention provides high speed, in band noise detection by monitoring the noise jitter present in the output of the amplitude limiter 13. While I have explained my invention in connection with one preferred embodiment, persons skilled in the art will appreciate this modifications may be made, particularly with respect to the signal-to-noise ratio or the noise spike amplitude required to squelch the receiver. Other values may be substituted for the integrator circuit capacitor C10 and resistor R21. Other frequency bands may be passed by the filter 23. And other full-wave rectifier arrangements may be used. Therefore, while I have shown only one embodiment of my invention, persons skilled in the art will appreciate that modifications may be made without departing from the spirit of the invention or from the scope of the claims.

What I claim as new and desire to secure by U.S. Letters Patent is:

1. In a power line carrier receiver having a frequency discriminator that produces an output signal in response to a frequency-shift-keyed signal, an improved noise detector circuit comprising:

a. input means adapted to be connected to said discriminator for receiving said output signal therefrom;

b. a high pass filter connected to said input means;

c. a rectifier connected to said high pass filter for producing a rectified signal therefrom;

d. a first trigger circuit connected to said rectifier, said first trigger circuit having first reference voltage means against which said rectified signal is compared, said first trigger circuit producing a good condition signal in response to said rectified signal exceeding said first reference voltage and producing a poor condition signal in response to said first reference voltage exceeding said rectified signal;

e. a second trigger circuit connected to said rectifier, said second trigger circuit having second reference voltage means against which said rectified signal is compared, said second reference voltage being greater than said first reference voltage, said second trigger circuit producing a good condition signal in response to said second reference voltage exceeding said rectified signal and producing a poor condition signal in response to said rectified signal exceeding said second reference voltage;

f. and means connected to said first and second trigger circuits for producing a signal that squelches said receiver in response to either of said poor condition signals.

2. The improved noise detector circuit of claim 1 wherein said input means provides for capacitively coupling said input means to said discriminator.

3. The improved noise detector circuit of claim 1 wherein said high pass filter rejects frequencies substantially below 300 Hertz.

4. The improved noise detector circuit of claim 1 wherein said second reference voltage is at least three times as great as said first reference voltage.

* * * * *